United States Patent
Bombard et al.

(10) Patent No.: US 10,372,207 B2
(45) Date of Patent: Aug. 6, 2019

(54) ADAPTIVE VR/AR VIEWING BASED ON A USERS EYE CONDITION PROFILE

(71) Applicant: DISNEY ENTERPRISES, INC., Burbank, CA (US)

(72) Inventors: Lee Bombard, Acton, CA (US); Yazmaliza Yaacob, North Hollywood, CA (US); Gregory Head, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/679,067

(22) Filed: Aug. 16, 2017

(65) Prior Publication Data

US 2019/0056780 A1 Feb. 21, 2019

(51) Int. Cl.
*G02B 27/01* (2006.01)
*G06F 3/01* (2006.01)
(Continued)

(52) U.S. Cl.
CPC .......... *G06F 3/013* (2013.01); *G02B 27/017* (2013.01); *G06F 3/0418* (2013.01);
(Continued)

(58) Field of Classification Search
CPC .......... G06F 3/013; G06F 19/00; G06F 3/012; G06F 1/163; G06F 3/147; G06F 3/011; G06F 1/1637; A61B 5/7435; A61B 1/00039; A61B 5/7445; A61B 5/749; A61B 3/112; A61B 5/4863; A61B 5/6803; A61B 1/00006; A61B 1/00048; G02B 27/017; G02B 27/0172; G02B 2027/0138; G02B 2027/0178; G02B 1/041; G02B 27/01; G02B 27/0093; G02B 27/283; G02B 2027/0134; G02B 2027/0194; G02B 27/0101; G02B 27/02; G02B 2027/0118; G02B 13/005; G02B 1/10; G02B 2027/0147; G02B 26/02; G02B 27/0149; G02B 2027/0185; G02B 27/0012
(Continued)

(56) References Cited

U.S. PATENT DOCUMENTS 9,418,617 B1 * 8/2016 Starner ............... G02B 27/017
9,794,550 B2 * 10/2017 Khabiri ............... G02B 27/017
(Continued)

*Primary Examiner* — Duc Q Dinh
(74) *Attorney, Agent, or Firm* — Sheppard Mullin Richter & Hampton LLP

(57) ABSTRACT

Techniques described herein are directed to adaptive virtual reality and augmented reality viewing based on a user's eye condition data. In a first implementation, a software application renders video content based on the user's eye condition data by mapping the user's eye condition data to video rendering parameters. The video content rendered based on the user's eye condition data may be made available to a virtual reality/augmented reality player and played using a head mounted display. The video content rendered based on the user's eye condition data may be pre-rendered before video content playback or rendered in real time during video content playback. In an additional implementation, the head mounted display may be calibrated and adjusted based on the eye condition data prior to video playback.

18 Claims, 5 Drawing Sheets

(51) Int. Cl.
*G06T 19/00* (2011.01)
*G06F 3/041* (2006.01)
(52) U.S. Cl.
CPC ...... *G06T 19/006* (2013.01); *G02B 2027/011* (2013.01); *G02B 2027/014* (2013.01); *G02B 2027/0112* (2013.01); *G02B 2027/0118* (2013.01); *G02B 2027/0127* (2013.01); *G02B 2027/0147* (2013.01); *G02B 2027/0178* (2013.01)
(58) Field of Classification Search
USPC .......................................................... 345/7–9
See application file for complete search history.

(56) References Cited

U.S. PATENT DOCUMENTS

| | | | |
|---|---|---|---|
| 9,976,867 B2* | 5/2018 | Debieuvre | G01C 21/20 |
| 2015/0370071 A1* | 12/2015 | Alton | G02B 27/0172 |
| | | | 349/11 |

* cited by examiner

ADAPTIVE VR/AR VIEWING BASED ON A USERS EYE CONDITION PROFILE

TECHNICAL FIELD

The present disclosure relates generally to augmented reality and virtual reality technology.

DESCRIPTION OF THE RELATED ART

Being immersed in augmented reality or virtual reality using a head-mounted display (HMD) may be an engaging and unique experience. The quality of this experience can depend on the level of immersion that the user of the head mounted display experiences as a result of the clarity and realism of the simulated or augmented environment.

BRIEF SUMMARY OF THE DISCLOSURE

Techniques described herein are directed to adaptive virtual reality and augmented reality viewing based on a user's eye condition data.

In a first embodiment, a method includes: receiving eye condition data associated with a user of a head mounted display; setting video rendering parameters for an augmented reality or virtual reality video file using at least the received eye condition data; rendering an augmented reality or virtual reality video file based on the set video rendering parameters; making the rendered video file available for playback by an augmented reality or virtual reality video player; and displaying the rendered video on the head mounted display using the video player. In some implementations, receiving the eye condition data includes: presenting the user of the head mounted display with a user interface for inputting eye condition data associated with the user.

The eye condition data may include: an amount of lens power prescribed to correct nearsightedness or farsightedness, an amount of lens power prescribed to correct for astigmatism, an axis value, an added magnifying power, an amount of prismatic power and direction prescribed to compensate for eye alignment problems, color blindness data, and other data.

The video rendering parameters may include: brightness, contrast, sharpness, color, aspect ratio, three dimensional settings, and other parameters.

In some implementations, the video file is prerendered prior to making the rendered video file available for playback and displaying the rendered video on the head mounted display. In other implementations, the video file is dynamically rendered during display of the rendered video on the head mounted display.

In one implementation, the method further includes: calibrating the head mounted display using the received eye condition data prior to displaying the rendered video on the head mounted display.

In some implementations, rendering the video file includes: rerendering an original video file that was rendered without using the eye condition data.

In some implementations, the eye condition data includes eye condition data for each of the left and right eyes of the user, and video rendering parameters are set for each of the left eye and right eye.

In one embodiment, a method includes: receiving eye condition data associated with a user of a head mounted display; calibrating the head mounted display for playback of an augmented reality or virtual reality video based on the received eye condition data; and after calibrating the head mounted display, displaying an augmented reality or virtual reality video on the head mounted display. In implementations, the head mounted display may be calibrated by adjusting the positioning of optical components within the head mounted display.

As used herein, the term "augmented reality" or "AR" generally refers to a view of a physical, real-world environment that is augmented or supplemented by computer-generated or digital information such as video, sound, and graphics. The digital information is directly registered in the user's physical, real-world environment such that the user may interact with the digital information in real time. The digital information may take the form of images, audio, haptic feedback, video, text, etc. For example, three-dimensional representations of digital objects may be overlaid over the user's view of the real-world environment in real time.

As used herein, the term "virtual reality" or "VR" generally refers to a simulation of a user's presence in an environment, real or imaginary, such that the user may interact with it.

As used herein to describe a user interface (UI) or graphical user interface (GUI), the term "user input" generally refers to any user action that generates data that triggers one or more actions at the UI (e.g., the input of eye condition data). User input may include, for example, a touch user interface gesture (e.g., taps, holds, swipes, pinches, etc.), vocal input (e.g., voice commands that are digitized and translated into a corresponding action), a keyboard input (e.g., pressing a keyboard key), a mouse input (e.g., clicking and/or moving a mouse pointer), and the like. User input may include a sequence of inputs, such as a particular sequence of touch gestures, voice commands, and/or key presses. User input may select, modify, or otherwise manipulate a displayed graphical control element such as, for example, buttons, checkboxes, menus, windows, sliders, navigational control elements, and the like.

Other features and aspects of the disclosed method will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

The figures are not exhaustive and do not limit the disclosure to the precise form disclosed.

DETAILED DESCRIPTION

Current augmented reality (AR) and virtual reality (VR) head mounted displays (HMD) do not properly address the specific needs of users with eye conditions (e.g., myopia, presbyopia, color blindness, stigmatism, etc.) that require personalized treatment to correct for the user's viewing condition. At best, current HMDs provide predetermined and generic settings that can be used to roughly adjust visual settings (e.g., zoom) without accounting for a user's personal eye condition, let alone differences in the user's left and right eye conditions. These generic settings do not provide any personalization for a user and may require adjustment during each new use of the HMD.

One example where this problem is prominent is with users of HMD that wear eyeglasses or other bifocals to correct for nearsightedness, farsightedness, astigmatism, color blindness, photosensitivity, stigmatism, or some other eye condition in the left and/or right eye. In many cases, it is uncomfortable or even impossible for a user to wear a HMD over the user's eye glasses. In such cases, the user may be distracted from the VR/AR environment by the discomfort of wearing the HMD over the eyeglasses, or the user may have to experience the VR/AR environment without wearing any eyeglasses (i.e., without vision correction). Accordingly, with current HMDs, users of prescription eye glasses may not be able to receive the full clarity and intended experience of VR or AR.

Embodiments disclosed herein are directed to addressing these problems. In various embodiments, eye condition data of a user of a HMD may be retrieved prior to image/video rendering and playback. Following retrieval of the user's eye condition data, content may be displayed to the user based on the user's eye condition data following one or a combination of two implementations. In a first implementation, a software application may render video content based on the user's retrieved eye conditions. The video content rendered based on the user's eye condition data may be fed to the VR/AR player and played using the HMD. In this implementation, video content rendered based on the user's eye condition data may be pre-rendered (i.e., rendered in advance) before video content playback or rendered in real time during video content playback.

In a second implementation, the HMD may be calibrated and adjusted based on the user's retrieved eye conditions. For example, the HMD's hardware (e.g., optical components such as a waveguide) and/or software settings may be calibrated and/or adjusted. In this implementation, the video file may be played through the HMD with the HMD's calibration settings.

Figure 1A:
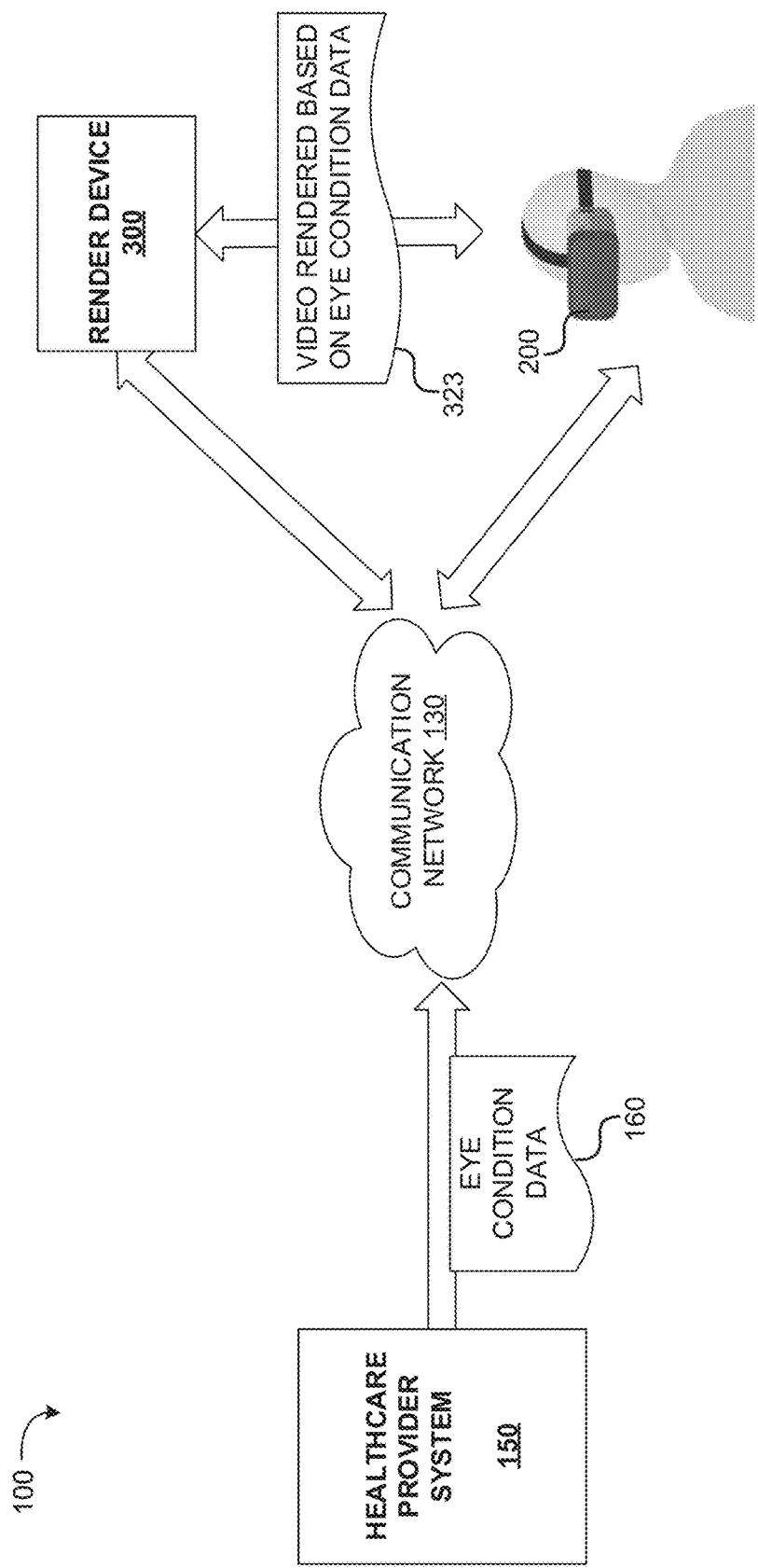
FIG. 1A illustrates a high-level block diagram of an exemplary system in accordance with the present disclosure

FIG. 1A illustrates a high-level block diagram of an exemplary system 100 in accordance with the present disclosure. It should be noted that although embodiments described herein will be primarily described with reference to presenting vision corrected video content to a user of a HMD, the systems and methods described herein may also be applied to other vision corrected media content such as images and video games. Additionally, in some implementations, the systems and methods described herein may be applied to present audio corrected content to a user of a HMD.

In system 100, head-mounted display (HMD) 200 presents VR and/or AR video content to a user that is rendered based on the eye conditions of the user. For example, the rendered video content 323 may account for the prescribed diopter correction of the user's left and right eyes. The rendered video content 323 may include, for example, a movie, a television series, a home video, a video retrieved from a social media or streaming site, etc.

Prior to video rendering and playback, eye condition data 160 associated with the user of HMD 200 is retrieved. As illustrated in the example of system 100, eye condition data 160 is retrieved from healthcare provider system 150 over communication network 130. For example, eye condition data 160 may be retrieved over a cable network, a cellular network, a satellite network, or some combination thereof.

Healthcare provider system 150 may include, for example, a system associated with an optometrist, ophthalmologist, or other healthcare provider that maintains a database including recent eye condition data 160 associated with the user. In implementations, healthcare provider system 150 may include a security module (not shown) configured to authenticate any device attempting to access any stored eye condition data over communication network 130. For example, the security module may use authentication methods such as password authentication, digital signature authentication, IP SEC authentication, Secure Sockets Layer (SSL) authentication, public-key cryptography authentication, etc. In other implementations, a user of HMD 200 may manually provide any eye condition data 160 or HMD 200 may capture eye condition data 160 of the user by presenting the user with a series of displays that test the user's left and right eyesight.

Eye condition data 160 may include, for example, the following measurements for each eye: the amount of lens power in diopters prescribed to correct nearsightedness or farsightedness (i.e., "sphere" or "SPH"), the amount of lens power in diopters prescribed to correct for astigmatism (i.e., "cylinder" or "CYL"), an axis value that describes the lens meridian containing no cylinder power to correct astigmatism, added magnifying power in diopters applied to a bottom part of a multifocal lens to correct presbyopia (i.e., "add"), the amount of prismatic power and direction prescribed to compensate for eye alignment problems (i.e., "prism"), and other measurements. Eye condition data 160 may also include, for example, data regarding whether the user has any color blindness (e.g., red-green or blue-yellow color blindness) and the degree of color blindness, and data regarding any other eye conditions that the user may have, such as macular degeneration, cataracts, glaucoma, etc.

In some implementations, other health condition data in addition to eye condition data 160 may be retrieved from healthcare provider system 150. For example, hearing sensitivity for each ear for different frequencies at different intensities (e.g., measured in hertz and decibels) may be transmitted as part of the health condition data.

Following retrieval of eye condition data 160 (e.g., over network 130 or by manual user input), render device 300 renders AR/VR video content 323 based on the retrieved eye condition data 160 for the user of HMD 200. In some implementations, the rendered AR/VR video content 323 may also be rendered using other retrieved health condition data. For example, hearing sensitivity data may be used to adjust the volume levels of different frequencies of audio presented with the video. The rendered video content 323 is made available to HMD 200 for playback. Specific techniques for rendering video content based on eye condition data associated with a user are further described below with reference to render device 300 and HMD 200.

Figure 1B:
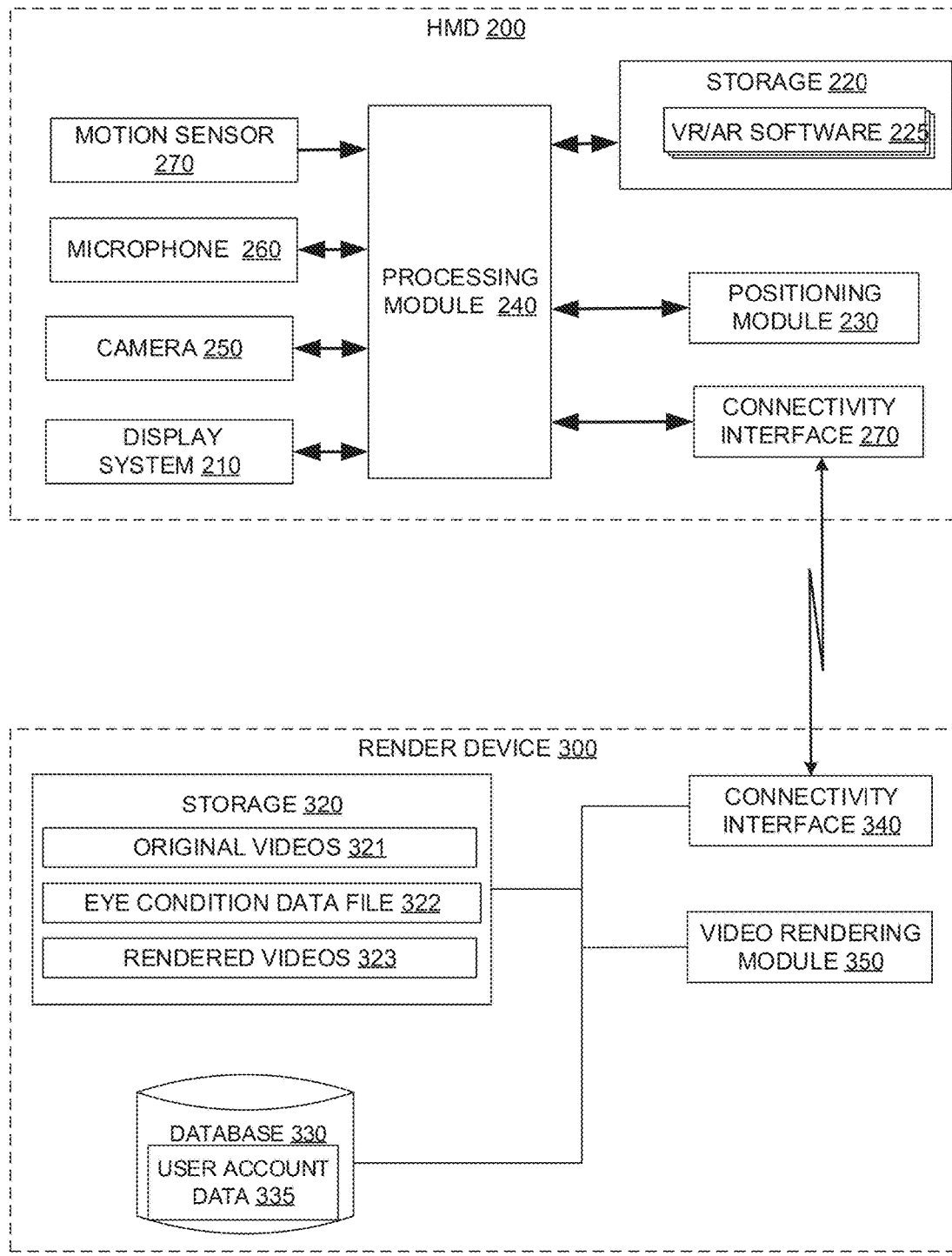
FIG. 1B is a block diagram illustrating an example architecture for components of a head mounted display and a render device that may be implemented in the system of FIG. 1A.

FIG. 1B is a block diagram illustrating an example architecture for components of a HMD device 200 and a render device 300 that may be used in example system 100 to present vision corrected VR/AR video content to a user.

HMD 200, in various embodiments, is any head-mounted system (e.g., a visor, glasses, goggles, head-mounted smartphone, etc.) that may display VR video content and/or AR video content that has been rendered based on eye condition data 160. For example, HMD 200 may display an AR view of a user's real world environment (e.g., by displaying digital objects overlaid over the real world environment) and/or a VR view of another environment. HMD 200 may comprise a display system 210, storage 220, positioning module 230, processing module 240, camera 250, microphone 260, motion sensor 270, and connectivity interface 280. HMD 200 may be tethered or untethered.

Display system 210 may include an AR display such as an optical see-through or video see-through display that supplements video of the user's real world environment with overlaid digital objects. For example, display system 210 may include a transparent OLED or LED screen that uses a waveguide or light guide to display digital objects overlaid over the real-world environment. In such implementations, optical components of display system 210 may include diffraction optics, polarized optics, reflective optics, holographic optics, or some combination thereof. For example, HMD 200 may include a waveguide that is a polarized waveguide, a diffractive waveguide, a holographic waveguide, a reflective waveguide, etc. Alternatively, display system 210 may include a VR video display that is not see-through.

Storage 220 may comprise volatile memory (e.g. RAM), non-volatile memory (e.g. flash storage), or some combination thereof. In various embodiments, storage 220 stores an AR or VR software application 225, that when executed by processing module 240 (e.g., a digital signal processor), generates an AR view or VR view on a display of display system 210. The view generated on display system 210 may display one or more overlaid digital objects and it may be used to place one or more digital objects. The displayed digital objects may be displayed based on eye condition data associated with the user. Additionally, in some implementations, storage 220 may store eye condition data associated with a user and videos rendered based on the user's eye condition data.

Positioning module 230 may comprise one or more devices for retrieving positional information over a network. For example, positioning module 230 may include a global positioning system receiver, a cellular receiver, a network interface card, an altimeter, or some combination thereof. The positional information retrieved by module 230 may be processed by processing module 240 to determine the geographical coordinates of HMD 200. For example, application software installed in storage 220 may use the location of HMD 200 from a GPS reading along with a map of declination (e.g., stored or retrieved from a network) to determine the geographical coordinates of HMD 200.

In AR HMD implementations, camera 250 may capture a video stream of the real world environment such that AR software may overlay digital objects over the real world environment to create an AR environment. The captured video stream may be encoded using a suitable video codec (e.g., H.265/MPEG-4) and stored as a video file in storage 220. Additionally, an AR software application may use the captured video stream to register AR objects with the real world environment and overlay them to create an AR environment. For example, in embodiments where display 210 is a video display, the digital video stream captured by camera is overlaid with digital objects. In embodiments, camera 250 may comprise an omnidirectional camera or multiple cameras capturing multiple fields of view.

Microphone 260 may capture vocal input from a user of AR device 200. Microphone 260 may be any transducer that converts sound into an electric signal that is converted to digital form. For example, microphone 260 may be a digital microphone including an amplifier and analog to digital converter. Alternatively, processing module 240 may digitize the electrical signals generated by microphone 260. The digitized audio stream may be encoded using a suitable audio codec (e.g., MP3 or FLAC) and stored as an audio file 226 in storage 220.

Motion sensor 270 receives or generates electronic input signals representative of the motion/position of HMD 200. These electronic input signals may be received and processed by circuity of processing module 240 to determine the motion of a user of HMD 200 and an absolute orientation of HMD 200 in the north-east-south-west (NESW) and up-down planes. Processing module 240 may store this orientation information in storage 220. In various embodiments, motion sensor 270 may comprise one or more gyroscopes, accelerometers, and magnetometers.

Connectivity interface 280 may connect AR headset 200 to render device 300 through a communication medium. The medium may comprise a wireless network system such as a BLUETOOTH system, a ZIGBEE system, an Infrared (IR) system, a Radio Frequency (RF) system, a wireless local area network, or the like. In further embodiments, connectivity interface 280 may connect HMD 200 to the Internet using a cellular network, a satellite network, a local area network, or some combination thereof.

Turning now to render device 300, it may include a storage 320, a database 330, a connectivity interface 340, and a video rendering module 350. In some implementations, render device 300 may be implemented as server. For example, the server may be an application server or a cloud-based server, and the server may comprise a plurality of servers (i.e., a server farm). Alternatively, in other implementations render device 300 may be a device associated with the user of HMD 200. For example, render device 300 may be a smartphone, laptop, desktop computer, or other computing device communicatively coupled to HMD 200 either through an ad-hoc network or through a local area network.

During operation, render device 300 may receive original video files 321 and eye condition data files 322 over connectivity interface 340 (e.g., from healthcare provider system 150 or as manual input from the user of HMD 200). For a given user, video rendering module 350 may rerender the original video files 321 associated with that user account by using an eye condition data file 322 associated with that user account. For example, a movie file may be rerendered using an eye condition data file 322 including eye condition data as described above. In some instances, render device 300 may dynamically render a video file 323 during playback by HMD 200. In alternative implementations, HMD 200 may perform the functions of video rendering module 350 (e.g., by executing VR/AR software 225).

Storage 320 may store original videos 321 (i.e., videos that have been rendered without taking into account user eye condition data), an eye condition data file 322 associated with the a user of HMD 200, and rendered videos 323 that are rendered based on eye condition data file 322.

Database 330 may store user account data 335 associated with one or more user accounts registered to receive rendered videos 323 from render device 300. The stored user account data 335 may include, for example, an identification of the primary user's name, an account name, an account password, information relating to the user's account subscription, etc. By way of example, HMD 200 executing VR/AR software 225, logged into a registered user account, may retrieve and playback rendered videos 323 from render device 300. In some instances, HMD 200 may also retrieve an eye condition data file 322 associated with the user account.

Figure 2:
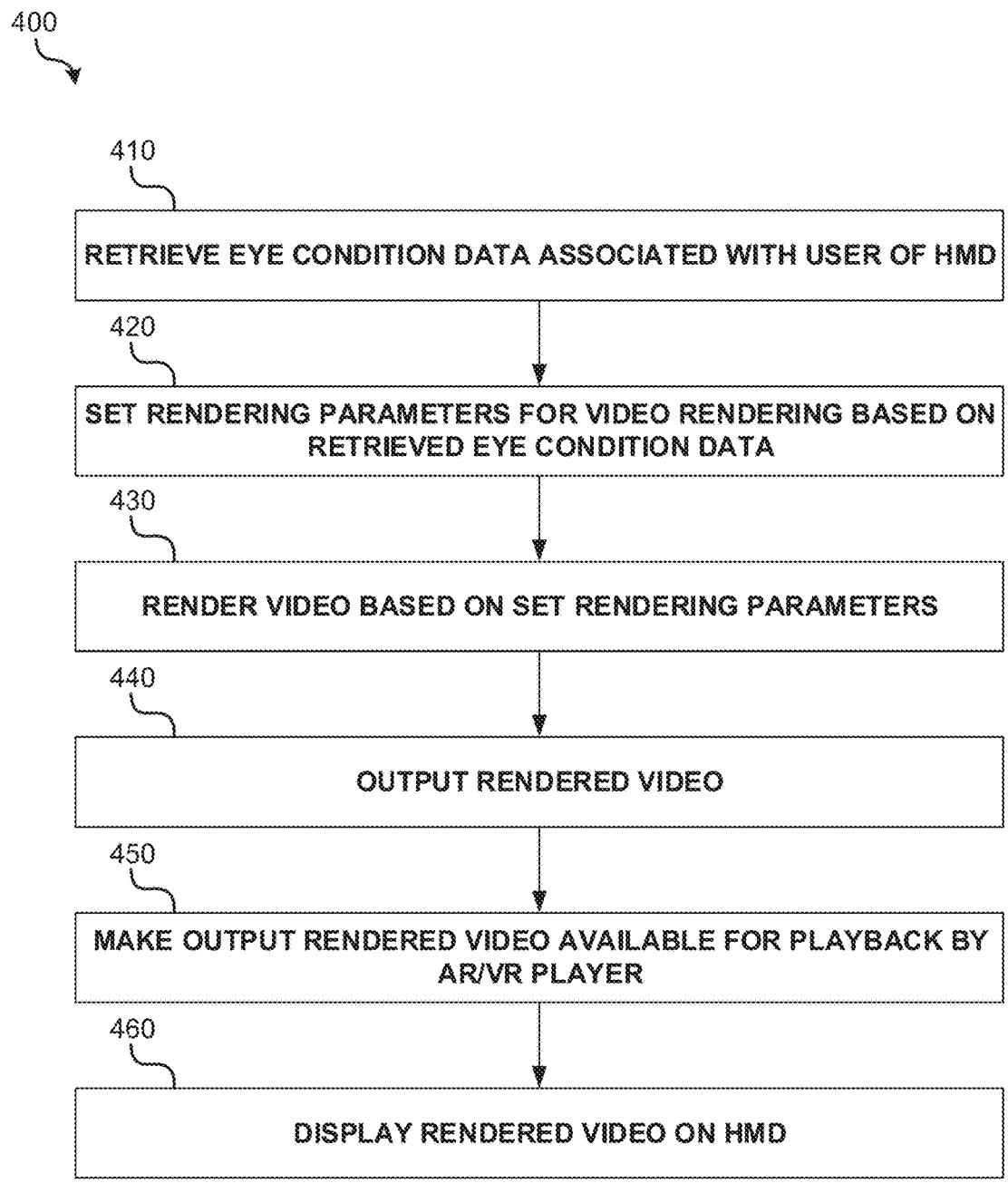
FIG. 2 is an operational flow diagram illustrating an example method that may be implemented to render augmented reality or virtual reality video content based on eye condition data.

FIG. 2 is an operational flow diagram illustrating an example method 400 that may be implemented to render AR/VR video content (e.g., create rendered video 323) based on eye condition data (e.g., an eye condition data file 322). For example, method 400 may be implemented by render device 300 and/or HMD 200.

At operation 410, eye condition data associated with the user of the HMD is retrieved. For example, eye condition data 160 may be retrieved from healthcare provider system 150 over a communication network by render device 300 and/or HMD 200. Alternatively, eye condition data may be manually input by a user of HMD 200 (e.g., through a graphical user interface that presents a series of controls for entering eye condition data). In one particular implementation, HMD 200 may present the user with a series of displays that test the user's vision for nearsightedness, farsightedness, astigmatism, color blindness and other conditions.

In some implementations, the retrieved eye condition data 160 may be formatted into a standardized eye condition data file 322 that may be used by a video rendering module 350 to create rendered videos based on the eye condition data. For example, the eye condition data file 322 may be formatted into an XML file format that may be read by any HMD 200, regardless of manufacturer. In this manner, for a particular user, an eye condition data file 322 may be reused during playback of subsequent videos on the same HMD 200 or a new HMD.

At operation 420, the retrieved eye condition data may be used to set rendering parameters for an augmented reality or virtual reality video rendering application. The eye condition data may be mapped to video rendering parameters. Eye condition data such as the amount of lens power in diopters prescribed to correct nearsightedness or farsightedness, the amount of lens power in diopters prescribed to correct for astigmatism, color blindness data and other vision data may be mapped to video rendering parameters. Example video rendering parameters that may be adjusted include: brightness, contrast, sharpness, color, color temperature, white balance, tonality, aspect ratio, depth perception, 3D settings, sharpness, etc. In implementations, video rendering parameters may be separately specified for the user's left eye and right eye. For example, a color video rendering parameter may be adjusted based on a user's color blind condition. As another example, an object depth perception video rendering parameter may be adjusted based on a user's depth perception limitation.

At operation 430, the video rendering application renders the video based on the rendering parameters that are set. For example, if the user's eye condition data includes a prescribed lens power in diopters, the rendered video may be optically "distorted" to provide the user of HMD 200 with a clearer picture during video playback. As another example, if the user is color blind in a particular color band, the color values of each pixel of the video (e.g., RGB values) may be adjusted to help the user better differentiate between different colors in the presented video.

In some implementations, the video may be rendered dynamically during playback. In such implementations, rendered video file segments may sequentially be made available to a VR/AR player during playback. Alternatively, in other implementations, the video may be prerendered before playback. For example, the video may be stored as a rendered video file 323 in storage 320 prior to playback. In some implementations, video rendering may also account for the settings of the display system of HMD 200.

In some implementations, the video may be rendered by rerendering an original video file 321 that was rendered without taking into account eye condition data. For example, color data, brightness data, sharpness data, and other data may be adjusted for each frame of the original video file 321. In some particular implementations, an affine transformation may be applied to each video frame of an original video to adjust for visual conditions.

At operation 440, the rendered video is output (e.g., as a rendered video file 323 or a segment of a rendered video file 323 in the case of dynamic playback). At operation 450, the rendered video is made available to an AR/VR player for playback. In some implementations, the AR/VR player may be an application of HMD 200 (e.g., provided through AR/VR software application 225). Alternatively, in implementations where HMD 200 functions as a tethered HMD 200, the AR/VR player may be a component of render device 300 or other device to which the HMD 200 is tethered.

At operation 460, the rendered video is displayed using HMD 200.

Figure 3:
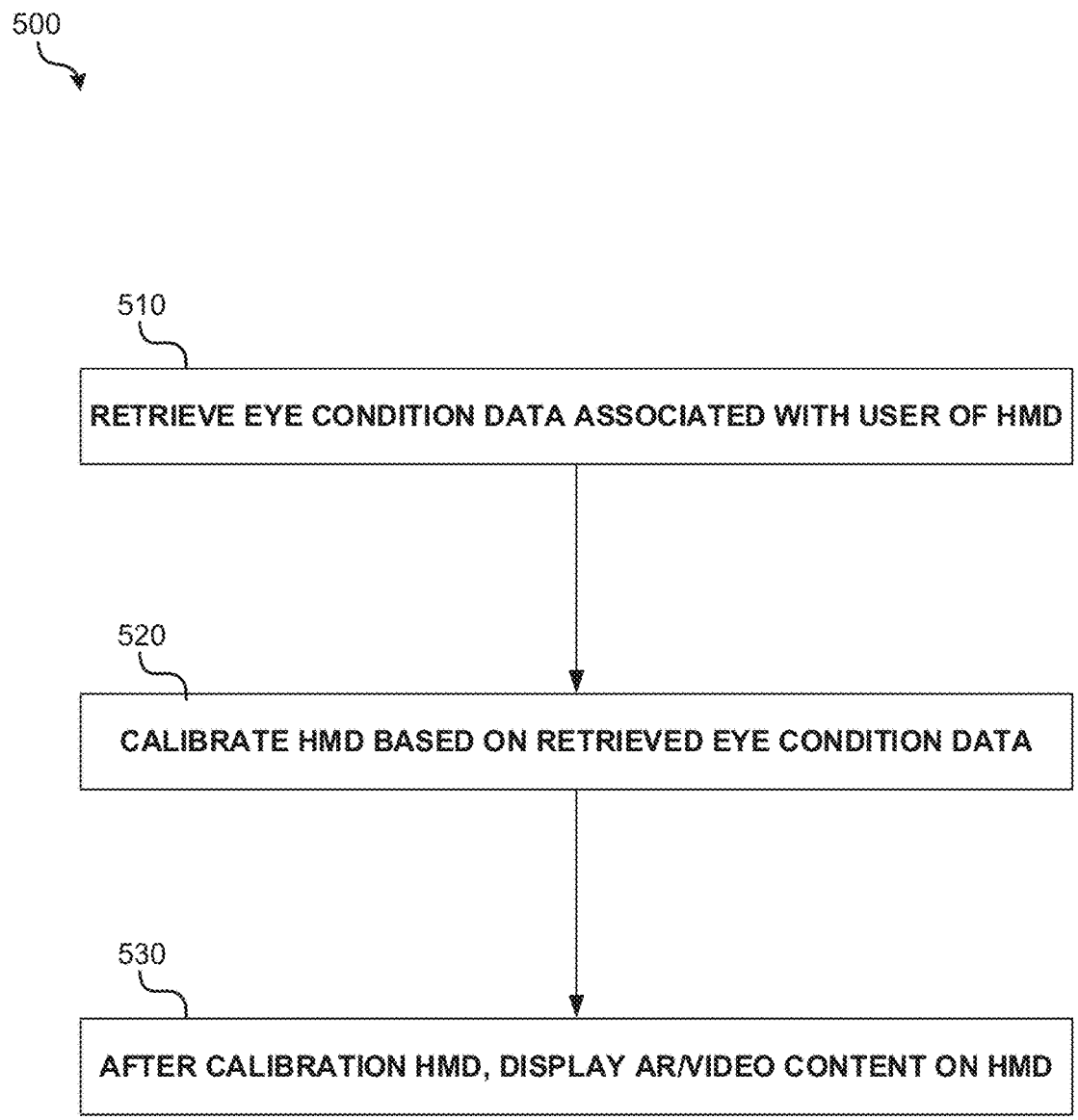
FIG. 3 is an operational flow diagram illustrating an example method that may be implemented to calibrate a head mounted display to account for the eye conditions of a user.

FIG. 3 is an operational flow diagram illustrating an example method 500 that may be implemented to calibrate a HMD 200 to account for the eye conditions of the user. At operation 510, eye condition data associated with the user of the HMD is retrieved. Eye condition data may be retrieved, for example, as described above with reference to operation 410.

At operation 520, the retrieved eye condition data 510 is used to calibrate the HMD prior to playback and display of video content. The HMD's hardware (e.g., optical components such as a waveguide) and/or software settings may be calibrated and/or adjusted depending on eye condition data such as the amount of lens power in diopters prescribed to correct nearsightedness or farsightedness, the amount of lens power in diopters prescribed to correct for astigmatism, color blindness data and other vision data. For example, in one implementation, a variable dark filter may be added to the HMD to accommodate a user's sensitivity to light (e.g. photophobia condition). As another example, the focal length and apertures of optical lenses of the HMD may be adjusted to account for eye conditions.

In one implementation, the HMD 200 or a device tethered to HMD 200 (e.g., rendering device 300) may present a graphical user interface for adjusting calibration settings of the HMD 200. For example, the optical configuration and display settings of the HMD 200 may be initially calibrated based on an eye condition data file 322. Following this initial calibration, a user of HMD 200 may be provided controls through a graphical user interface to refine the calibration (e.g., by presenting the user with a calibrated image).

Following calibration of the HMD, at operation 530, AR/VR video content may be played and displayed through the HMD 200.

In some implementations method 500 may be used in combination with method 400. For example, in cases where video rendering can correct for a first set of vision conditions and calibration of the optical components of the HMD 200 can correct for a second set of vision conditions, eye condition data may be used to both render the video content and calibrate the HMD 200. In this implementation, the video content is first rendered based on the eye condition data and then displayed by the HMD 200 using the calibrated settings (e.g., reconfiguration of the optical components).

Although the foregoing examples have been described with reference to rendering AR/VR video content based on eye condition data, other health condition data may be used to render the AR/VR content. For example, in the case that hearing condition data is received, an audio component of the rendered video may be adjusted such that certain frequencies of the audio component play at higher or lower volumes. As another example, the output of one or more speakers associated with the HMD may be calibrated such that certain frequencies of audio play at higher or lower volumes.

Figure 4:
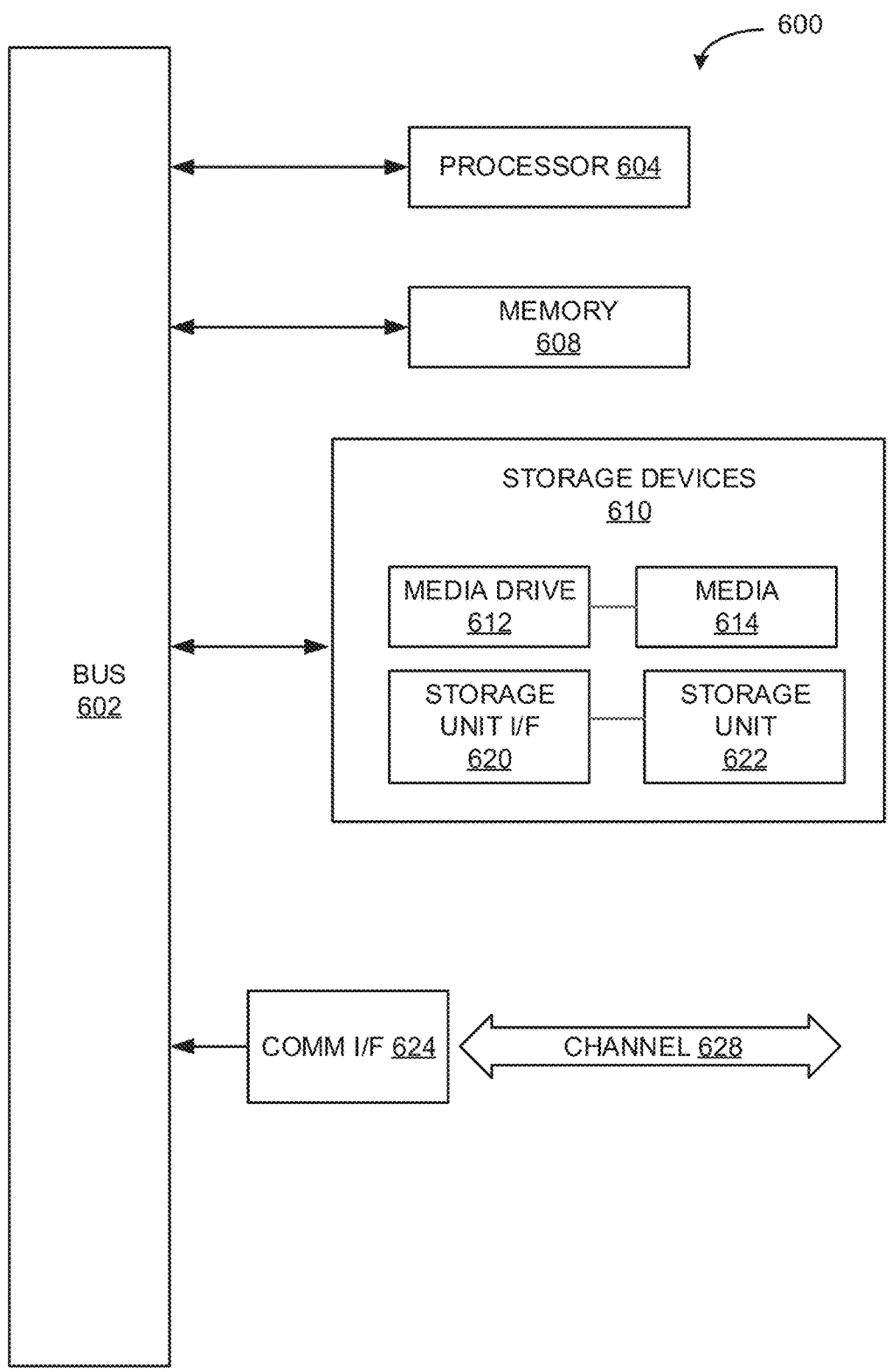
FIG. 4 illustrates an example computing module that may be used to implement various features of the methods disclosed herein.

FIG. 4 illustrates an example computing module that may be used to implement various features of the methods disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 4. Various embodiments are described in terms of this example-computing module 600. After reading this description, it will become apparent to a person skilled in the relevant art how to implement the application using other computing modules or architectures.

Referring now to FIG. 4, computing module 600 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 600 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 600 might include, for example, one or more processors, controllers, control modules, or other processing devices, such as a processor 604. Processor 604 might be implemented using a general-purpose or special-purpose processing engine such as, for example, a microprocessor, controller, or other control logic. In the illustrated example, processor 604 is connected to a bus 602, although any communication medium can be used to facilitate interaction with other components of computing module 600 or to communicate externally.

Computing module 600 might also include one or more memory modules, simply referred to herein as main memory 608. For example, preferably random access memory (RAM) or other dynamic memory, might be used for storing information and instructions to be executed by processor 604. Main memory 608 might also be used for storing temporary variables or other intermediate information during execution of instructions to be executed by processor 604. Computing module 600 might likewise include a read only memory ("ROM") or other static storage device coupled to bus 602 for storing static information and instructions for processor 604.

The computing module 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid state drive, a magnetic tape drive, an optical disk drive, a CD or DVD drive (R or RW), or other removable or fixed media drive might be provided. Accordingly, storage media 614 might include, for example, a hard disk, a solid state drive, magnetic tape, cartridge, optical disk, a CD, DVD, or Blu-ray, or other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing module 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory module) and memory slot, a PCMCIA slot and card, and other fixed or removable storage units 622 and interfaces 620 that allow software and data to be transferred from the storage unit 622 to computing module 600.

Computing module 600 might also include a communications interface 624. Communications interface 624 might be used to allow software and data to be transferred between computing module 600 and external devices. Examples of communications interface 624 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer readable medium", "computer usable medium" and "computer program medium" are used to generally refer to non-transitory media, volatile or non-volatile, such as, for example, memory 608, storage unit 622, and media 614. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 600 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

What is claimed is:

1. A method, comprising:
 receiving eye condition data associated with a user of a head mounted display;
 formatting the received eye condition data into an eye condition data file;
 setting video rendering parameters for an augmented reality or virtual reality video file by mapping the formatted eye condition data to the video rendering parameters;
 rendering an augmented reality or virtual reality video file based on the set video rendering parameters, wherein rendering the augmented reality or virtual reality video file comprises using at least the eye condition data file to rerender an original video file that was rendered without using eye condition data;

making the rendered video file available for playback by an augmented reality or virtual reality video player; and displaying the rendered video on the head mounted display using the video player.

2. The method of claim 1, wherein receiving the eye condition data comprises:

presenting the user of the head mounted display with a user interface for inputting eye condition data associated with the user.

3. The method of claim 1, wherein the video file is prerendered prior to making the rendered video file available for playback and displaying the rendered video on the head mounted display.

4. The method of claim 3, further comprising: using at least the eye condition data file to calibrate settings of the head mounted display prior to displaying the rendered video on the head mounted display, wherein the calibrated settings comprise an adjustment of an optical component and display setting of the head mounted display, where the head mounted display displays the rendered video file using the calibrated settings.

5. The method of claim 1, wherein the video file is dynamically rendered during display of the rendered video on the head mounted display.

6. The method of claim 1, wherein the eye condition data comprises eye condition data for each of the left and right eyes of the user, and wherein video rendering parameters are set for each of the left eye and right eye.

7. The method of claim 1, wherein the eye condition data comprises at least one of: an amount of lens power prescribed to correct nearsightedness or farsightedness, an amount of lens power prescribed to correct for astigmatism, an axis value, an added magnifying power, an amount of prismatic power and direction prescribed to compensate for eye alignment problems, and color blindness data.

8. The method of claim 7, wherein the video rendering parameters at least one of: brightness, contrast, sharpness, color, aspect ratio, and three dimensional settings.

9. The method of claim 1, further comprising:

using at least the eye condition data file to calibrate the head mounted display for playback of an augmented reality or virtual reality video, wherein calibrating the head mounted display comprises adjusting an optical component or display setting of the head mounted display.

10. The method of claim 9, wherein the eye condition data comprises at least one of: an amount of lens power prescribed to correct nearsightedness or farsightedness, an amount of lens power prescribed to correct for astigmatism, an axis value, an added magnifying power, an amount of prismatic power and direction prescribed to compensate for eye alignment problems, and color blindness data.

11. A system, comprising:

a head mounted display; and a non-transitory computer-readable medium having instructions stored thereon that, when executed by a processor cause the system to:

receive eye condition data associated with a user of the head mounted display;

formatting the received eye condition data into an eye condition data file;

set video rendering parameters for an augmented reality or virtual reality video file by mapping the formatted eye condition data to the video rendering parameters;

render an augmented reality or virtual reality video file based on the set video rendering parameters, wherein rendering the augmented reality or virtual reality video file comprises using at least the eye condition data file to rerender an original video file that was rendered without using eye condition data;

make the rendered video file available for playback by an augmented reality or virtual reality video player; and display the rendered video on the head mounted display using the video player.

12. The system of claim 11, wherein receiving the eye condition data comprises:

presenting the user of the head mounted display with a user interface for inputting eye condition data associated with the user.

13. The system of claim 11, wherein the video file is prerendered prior to making the rendered video file available for playback and displaying the rendered video on the head mounted display.

14. The system of claim 13, wherein the instructions, when executed by the processor, further cause the system to: use at least the eye condition data file to calibrate settings of the head mounted display prior to displaying the rendered video on the head mounted display, wherein the calibrated settings comprise an adjustment of an optical component and display setting of the head mounted display, where the head mounted display displays the rendered video file using the calibrated settings.

15. The system of claim 11, wherein the video file is dynamically rendered during display of the rendered video on the head mounted display.

16. The system of claim 11, wherein the eye condition data comprises eye condition data for each of the left and right eyes of the user, and wherein video rendering parameters are set for each of the left eye and right eye.

17. The system of claim 11, wherein the eye condition data comprises at least one of: an amount of lens power prescribed to correct nearsightedness or farsightedness, an amount of lens power prescribed to correct for astigmatism, an axis value, an added magnifying power, an amount of prismatic power and direction prescribed to compensate for eye alignment problems, and color blindness data.

18. The system of claim 17, wherein the video rendering parameters at least one of: brightness, contrast, sharpness, color, aspect ratio, and three dimensional settings.

* * * * *